US009729256B2

(12) United States Patent
Zou et al.

(10) Patent No.: US 9,729,256 B2
(45) Date of Patent: Aug. 8, 2017

(54) METHOD AND SYSTEM FOR ISSUING AND ACQUIRING INFORMATION (71) Applicant: ZTE Corporation, Shenzhen, Guangdong (CN)

(72) Inventors: Wei Zou, Shenzhen (CN); Jie Cui, Shenzhen (CN); Xiaofeng Cheng, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 275 days.

(21) Appl. No.: 14/408,343

(22) PCT Filed: Jun. 8, 2013

(86) PCT No.: PCT/CN2013/077025
§ 371 (c)(1),
(2) Date: Dec. 16, 2014

(87) PCT Pub. No.: WO2013/189249
PCT Pub. Date: Dec. 27, 2013

(65) Prior Publication Data
US 2015/0256278 A1 Sep. 10, 2015

(30) Foreign Application Priority Data

Jun. 20, 2012 (CN) .......................... 2012 1 0205348

(51) Int. Cl.
H04H 20/72 (2008.01)
H04W 4/06 (2009.01)
H04W 84/18 (2009.01)

(52) U.S. Cl.
CPC ............. H04H 20/72 (2013.01); H04W 4/06 (2013.01); H04W 84/18 (2013.01)

(58) Field of Classification Search
CPC ....... H04L 67/04; H04L 67/18; H04L 12/189; H04L 12/1854; H04L 67/24;
(Continued)

(56) References Cited

U.S. PATENT DOCUMENTS

2001/0005368 A1* 6/2001 Rune .................... H04L 12/1854
370/390
2001/0021638 A1* 9/2001 Spratt ..................... H04W 4/06
455/11.1

(Continued)

FOREIGN PATENT DOCUMENTS

CN 101242564 A 8/2008
CN 101741917 A 6/2010
(Continued)

OTHER PUBLICATIONS

International Search Report in international application No. PCT/CN2013/077025, mailed on Sep. 19, 2013.
(Continued)

Primary Examiner — Jung-Jen Liu
(74) Attorney, Agent, or Firm — Oppedahl Patent Law Firm LLC (57) ABSTRACT The present disclosure discloses a method for issuing information including: an ad hoc network including an information issuing node and a client node is established; when a user to which the information issuing node is attributive desires to issue information, the information issuing node stores information issued by the user, broadcasts the information issued by the user to the ad hoc network and notifies all other nodes of the ad hoc network to update information of the information issuing node. The present disclosure also discloses a system for issuing information and a method and system for acquiring information. The methods and systems make it possible to implement timely and efficient issuing and acquisition of information.

12 Claims, 7 Drawing Sheets (58) Field of Classification Search
CPC .... H04L 1/1867; H04W 84/10; H04W 8/005;
H04W 88/04; H04W 4/06; H04W 48/14;
H04W 84/18; H04W 40/28; H04W 28/02
See application file for complete search history.

(56) References Cited

U.S. PATENT DOCUMENTS

| | | | | |
|---|---|---|---|---|
| 2003/0190938 | A1* | 10/2003 | Ganton | H04W 52/00 455/574 |
| 2007/0104160 | A1* | 5/2007 | Ho | H04W 48/14 370/338 |
| 2010/0302947 | A1* | 12/2010 | Leppanen | H04L 1/1867 370/241 |

FOREIGN PATENT DOCUMENTS

| | | |
|---|---|---|
| CN | 102769829 A | 11/2012 |
| WO | 0141379 A1 | 6/2001 |

OTHER PUBLICATIONS

English Translation of the Written Opinion of the International Search Authority in international application No. PCT/CN2013/077025, mailed on Sep. 19, 2013.
Supplementary European Search Report in European application No. 13807859.7, mailed on May 19, 2015.

\* cited by examiner

METHOD AND SYSTEM FOR ISSUING AND ACQUIRING INFORMATION

TECHNICAL FIELD

The present disclosure relates to the field of mobile wireless communications, and in particular to a method and system for issuing and acquiring information.

BACKGROUND

At present, there are mainly two methods for issuing information of parking lots and business information: one is posting notices at entrances of parking lots and shopping malls or implementing these through electronic display panels. When this method is used, drivers will not know information of parking lots until driving to entrances of the parking lots, similarly, clients will not know business information unit arriving at entrances of businesses. Another method is implemented by way of websites, specifically information of parking lots and business information are issued via websites, and clients access the websites by using Personal Computers (PCs) so as to acquire the information of parking lots and business information therefrom, but this method also has some limitations summarized in below aspects:

(1) For clients, they can acquire corresponding information only by way of accessing the Internet, thus causing inconvenience to the clients. Specifically, a client must access the Internet, and he/she can acquire desired information only after tedious searching and screening, this is of great inconvenience particularly for clients on a street, furthermore, expenses for accessing the Internet will be generated.

(2) For enterprises and businesses, maintaining websites will be difficult and costs a lot of money. Specifically, the establishment of a website involves software encoding, domain application, application for server space and the like and it has many steps thus a long time of construction that must be implemented by professionals, thus it costs a lot and is difficult to maintain, thereby not applicable to small or medium sized businesses.

It can be seen from above description that both existing approaches for businesses to issue related information and existing methods for clients to acquire information of parking lots and business information have certain disadvantages that result in poor user experiences.

SUMMARY

In view of the above, the present disclosure is intended to provide a method and system for issuing and acquiring information, capable of implementing in time issuing and acquisition of information.

To this end, the technical solutions of the present disclosure are implemented as follows.

The present disclosure provides a method for issuing information, which includes establishment of an ad hoc network including an information issuing node and a client node, and the method further includes:

when a user to which the information issuing node is attributive desires to issue information, the information issuing node stores information issued by the user, broadcasts the information issued by the user to the ad hoc network and notifies all other nodes of the ad hoc network to update information of the information issuing node.

In the above solution, the broadcasting the information issued by the user to the ad hoc network and notifying all other nodes of the ad hoc network to update information of the information issuing node includes:

the information issuing node transmits the information issued by the user to an adjacent node directly connected therewith; after receiving the information issued by the user, the adjacent node updates information stored therein corresponding to the user, and forwards received information to other nodes connected therewith other than a node transmitting the information issued by the user after determining that the adjacent node itself is a routing node, and so on until all other nodes of the ad hoc network receive the information issued by the user;

In an embodiment, the adjacent node may be an information issuing node and/or a client node.

In the above solution, the method further includes: when determining that the adjacent node itself is not a routing node, the adjacent node performs no operations any more after updating the information stored therein corresponding to the user.

In the above solution, the method further includes: when a new information issuing node is added into the ad hoc network, the new information issuing node acquires and stores information issued by users to which all information issuing nodes of the ad hoc network are attributive through transmitting an information acquisition request to a node connected therewith in the ad hoc network.

In the above solution, the acquiring by the new information issuing node information issued by users to which all information issuing nodes of the ad hoc network are attributive through transmitting an information acquisition request to a node connected therewith in the ad hoc network includes:

the new information issuing node transmits the information acquisition request to the node connected therewith in the ad hoc network, a node receiving the information acquisition request returns information stored therein to the new information issuing node, and after determining that the information stored therein is part of the information issued by users to which all information issuing nodes of the ad hoc network are attributive, modifies a scope of information desired to be acquired in the received information acquisition request and forwards the modified information acquisition request to a next node directly connected therewith; and the next node determines whether itself stores all information desired by the received information acquisition request according to a scope of information desired to be acquired in the received information acquisition request, after determining itself stores part of information desired by the received information acquisition request, returns to the new information issuing node part of information desired by the received information acquisition request and stored therein through forwarding by a routing node, modifies the scope of information desired to be acquired in the received information acquisition request and forwards the modified information acquisition request to a further next node directly connected therewith, and so on until the new information issuing node acquires the information issued by users to which all information issuing nodes of the ad hoc network are attributive;

the new information issuing node compares ID numbers and issuing time of all received information so as to obtain newest information issued by users to which all information issuing nodes of the ad hoc network are attributive.

In the above solution, the method further includes:

after a node receiving an information acquisition request transmitted by the new information issuing node determines that information stored in the node itself is total information issued by users to which all information issuing nodes of the ad hoc network are attributive, the node returns to the new information issuing node all information desired by the received information acquisition request and stored in the node itself; or after a next node receiving an information acquisition request determines that itself stores all information desired by the received information acquisition request, the next node returns directly to the new information issuing node through a routing node all information desired by the received information acquisition request and stored in the next node itself.

The present disclosure further provides a method for acquiring information, which includes establishment of an ad hoc network including an information issuing node and a client node, and the method further includes:

when desiring to acquire information, the client node acquires information desired to be acquired through transmitting an information acquisition request to an adjacent node directly connected therewith in the ad hoc network.

In the above solution, the adjacent node is a client node and/or an information issuing node.

In the above solution, the acquiring by the client node information desired to be acquired through transmitting an information acquisition request to an adjacent node directly connected therewith in the ad hoc network includes:

the client node transmits the information acquisition request to the adjacent node; the adjacent node determines whether itself stores all information desired by the received information acquisition request according to a scope of information desired to be acquired in the received information acquisition request, after determining itself stores part of information desired by the received information acquisition request, returning to the client node part of information desired by the received information acquisition request and stored therein, modifies the scope of information desired to be acquired in the received information acquisition request and forwards the modified information acquisition request to a next node directly connected therewith;

the next node determines whether itself stores all information desired by the received information acquisition request according to a scope of information desired to be acquired in the received information acquisition request, after determining itself stores part of information desired by the received information acquisition request, returns to the client node part of information desired by the received information acquisition request and stored therein through forwarding by a routing node, modifies the scope of information desired to be acquired in the received information acquisition request and forwards the modified information acquisition request to a further next node directly connected therewith, and so on until the client node acquires the information desired to be acquired;

the client node compares ID numbers and issuing time of all received information so as to obtain newest information desired to be acquired.

In the above solution, the method further includes: after the adjacent node determines that itself stores all information desired by the received information acquisition request, it returns to the client node all information desired by the received information acquisition request and stored in the adjacent node itself; or after the next node determines that itself stores all information desired by the received information acquisition request, it returns directly to the client node through a routing node all information desired by the received information acquisition request and stored in the next node itself.

In the above solution, the method further includes: after the adjacent node determines that itself doesn't store information desired by the received information acquisition request, it forwards directly the received information acquisition request to other nodes directly connected therewith;

accordingly, after the next node determines that itself doesn't store information desired by the received information acquisition request, it forwards directly the received information acquisition request to a node directly connected therewith.

The present disclosure further provides a system for issuing information, and the system includes a first information issuing node configured to, when a user to which the first information issuing node is attributive desires to issue information, store information issued by the user, broadcast the information issued by the user to an ad hoc network including an information issuing node and a client node where itself is located and notify all other nodes of the ad hoc network to update information of the first information issuing node.

In the above solution, the system further includes a second information issuing node and/or a client node;

when broadcasting the information issued by the user to the ad hoc network where itself is located, the first information issuing node is specifically configured to broadcast the information issued by the user to the ad hoc network where itself is located and notify all other nodes of the ad hoc network to update information of the first information issuing node through the second information issuing node and/or the client node.

In the above solution, the system further includes a third information issuing node configured to, when itself is newly added into the ad hoc network, acquire and store information issued by users to which all information issuing nodes of the ad hoc network are attributive through transmitting an information acquisition request to a node connected therewith in the ad hoc network.

The present disclosure further provides a system for acquiring information, and the system includes a first client node, a second client node and/or an information issuing node, wherein the first client node is configured to, when desiring to acquire information, acquire information desired to be acquired through transmitting an information acquisition request to a second client node and/or an information issuing node of an ad hoc network including an information issuing node and a client node and directly connected therewith.

In the method and system for issuing information provided by the present disclosure, an ad hoc network including an information issuing node and a client node is established; when a user to which the information issuing node is attributive desires to issue information, the information issuing node stores information issued by the user, broadcasts the information issued by the user to the ad hoc network and notifies all other nodes of the ad hoc network to update information of the information issuing node, in this way, timely and efficient issuing of information can be implemented, thus improving user experiences.

Furthermore, in the method and system for acquiring information provided by the present disclosure, an ad hoc network including an information issuing node and a client node is established; when desiring to acquire information, the client node acquires information desired to be acquired through transmitting an information acquisition request to an adjacent node directly connected therewith in the ad hoc network, in this way, timely and efficient issuing of information can be implemented, thus improving user experiences.

In addition, technical solutions provided by the present disclosure can implement flexible networking, and can issue and acquire information without accessing the Internet.

Besides, devices implemented by using technical solutions provided by the present disclosure are simple, cheap and easy to maintain, and in practical use even WiFi devices provided by places such as a hotel or restaurant can be directly used to establish an ad hoc network so as to implement issuing and acquisition of information.

DETAILED DESCRIPTION

The present disclosure will be further elaborated below with reference to accompanying drawings and embodiments.

An ad hoc network is a multi-hop, decentralized and self-organizing type of wireless network and also referred to as a multi-hop network, infrastructureless network or self-organizing network. In an ad hoc network, the whole network has no fixed infrastructures, and each node is mobile and able to dynamically keep connection with other nodes in any way. In an ad hoc network, due to the finiteness of a value range of a mobile terminal's wireless coverage, two mobile terminals that can't communicate directly may perform packet forwarding of data by virtue of other nodes. Each node is also a router at the same time, it can implement functionality of finding and maintaining routing to other nodes.

An ad hoc network is a special wireless mobile network. All nodes of the network have equal status without the need to arrange any central control nodes. Nodes of the network have not only functionality of common mobile terminals but also capabilities for forwarding messages. Compared to a common mobile network and fixed network, the ad hoc network has below features:

(1) Network independence. The greatest difference between an ad hoc network and a common mobile or fixed network lies in that the former makes it possible to rapidly establish, at any time in any places, a mobile communication network without being supported by network infrastructures. The establishment of the ad hoc network doesn't depend on existing network communication infrastructures thus has certain independence.

(2) Dynamically changing network topology. In an ad hoc network, nodes can move randomly, the movement of nodes may result in addition or disappearance of links between nodes thus the relationship between nodes is ever-changing; in addition, in an established ad hoc network, nodes may also be routers, thus their movements make the topology of the ad hoc network ever-changing with both its way and rate of change unpredictable.

(3) Distributed nature. In an ad hoc network there are no central control nodes and nodes thereof are interconnected through a distributed protocol. If one or some nodes of the network experience a fault, other node can still operate normally.

Figure 1:
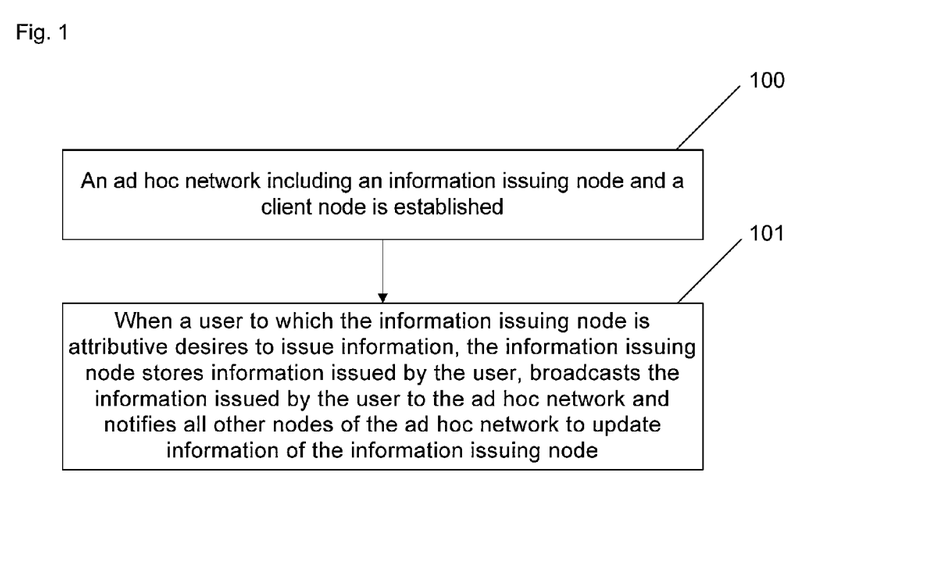
FIG. 1 is a schematic flow chart of a method for issuing information according to the present disclosure.

Based on above, the method for issuing information according to the present disclosure, as shown in FIG. 1, includes the following steps:

Step 100, an ad hoc network including an information issuing node and a client node is established, then proceed to step 101;

Herein this step may be implemented by using the prior art.

Specifically, the information issuing node can be regarded as a server, and in practical use all information issuing nodes constitute a group of servers, which are static or dynamic and open, for users to access. Besides used to network and forward messages, the information issuing node is also used to receive and store information issued by users namely businesses to which all other information issuing nodes are attributive.

In addition, the information issuing node may further and can only modify information issued by a user to which itself is attributive. When information issued by a user to which an information issuing node itself is attributive changes, the information issuing node will notify all other nodes in an established ad hoc network to update the information issued by the user to which itself is attribute. Herein the information can specifically be business information which may include information of parking lots or business information of shopping malls.

One user can have one or more information issuing nodes attributive to him/her, which may be fixed or mobile.

The client node is configured to store and forward information issued by a user to which the information issuing node is attributive and it can further be configured to acquire the information issued by the suer to which the information issuing node is attributive, but it can't modify acquired and/or stored information. The client node can join in an ad hoc network desired to join in through searching and transmits an information acquisition request for acquiring corresponding information from other nodes. Herein the other nodes can be an information issuing node or a client node.

In an embodiment, the client node may specifically be a mobile terminal used by a client.

Step 101, when a user to which the information issuing node is attributive desires to issue information, the information issuing node stores information issued by the user, broadcasts the information issued by the user to the ad hoc network and notifies all other nodes of the ad hoc network to update information of the information issuing node.

Specifically, the broadcasting may include: the information issuing node transmits the information issued by the user to an adjacent node directly connected therewith; after receiving the information issued by the user, the adjacent node updates information stored therein corresponding to the user, and forwards received information to other nodes connected therewith other than a node transmitting the information issued by the user after determining that the adjacent node itself is a routing node, and so on until all other nodes of the ad hoc network receive the information issued by the user;

In an embodiment, when determining that the adjacent node itself is not a routing node, the adjacent node performs no operations any more after updating the information stored therein corresponding to the user.

Accordingly, after receiving the Information issued by the user, all other nodes of the ad hoc network update information stored therein corresponding to the user, thus implementing issuing of the information on respective nodes of the ad hoc network.

The structure of stored information can be on a per-user basis, i.e., information issued by each user is a piece of information; the content of stored information issued by each user includes an ID number, name, type, business information and issuing time; specifically, the ID number is used to identify a unique user, the name is used to identify a specific user to facilitate clients for searching, the type is used to identify management type of a user, the business information is used to identify specific information issued by a user, and the issuing time is used to identify a specific time when business information is modified by a user.

Herein the issuing information may include issuing new business information or updating existing business information.

The adjacent node may be a client node and/or other information issuing nodes other than an information issuing node attributive to the user.

Specific processes for finding out an adjacent node directly connected therewith in the ad hoc network and determining whether a node is a routing node are the prior art, thus the detailed description thereof will be omitted.

The method may further include: when a new information issuing node is added into the ad hoc network, the new information issuing node acquires and stores information issued by users to which all information issuing nodes of the ad hoc network are attributive through transmitting an information acquisition request to a node connected therewith in the ad hoc network.

Specifically, the new information issuing node transmits the information acquisition request to the node connected therewith in the ad hoc network, a node receiving the information acquisition request returns information stored therein to the new information issuing node, and after determining that the information stored therein is part of the information issued by users to which all information issuing nodes of the ad hoc network are attributive, modifies a scope of information desired to be acquired in the received information acquisition request and forwards the modified information acquisition request to a next node directly connected therewith; andthe next node determines whether itself stores all information desired by the received information acquisition request according to a scope of information desired to be acquired in the received information acquisition request, after determining itself stores part of information desired by the received information acquisition request, returns to the new information issuing node part of information desired by the received information acquisition request and stored therein through forwarding by a routing node, modifies the scope of information desired to be acquired in the received information acquisition request and forwards the modified information acquisition request to a further next node directly connected therewith, and so on until the new information issuing node acquires the information issued by users to which all information issuing nodes of the ad hoc network are attributive;

the new information issuing node compares ID numbers and issuing time of all received information so as to obtain newest information issued by users to which all information issuing nodes of the ad hoc network are attributive.

In an embodiment, after a node receiving an information acquisition request transmitted by the new information issuing node determines that information stored in the node itself is total information issued by users to which all information issuing nodes of the ad hoc network are attributive, the node returns to the new information issuing node all information desired by the received information acquisition request and stored in the node itself, accordingly, information received by the new information issuing node is information issued by users to which all information issuing nodes of the ad hoc network are attributive, then there is no need to compare ID numbers and issuing time in the received information.

Accordingly, after a next node receiving an information acquisition request determines that itself stores all information desired by the received information acquisition request, the next node returns directly to the new information issuing node through a routing node all information desired by the received information acquisition request and stored in the next node itself, and then doesn't forward the information acquisition request to a node directly connected therewith.

Figure 2:
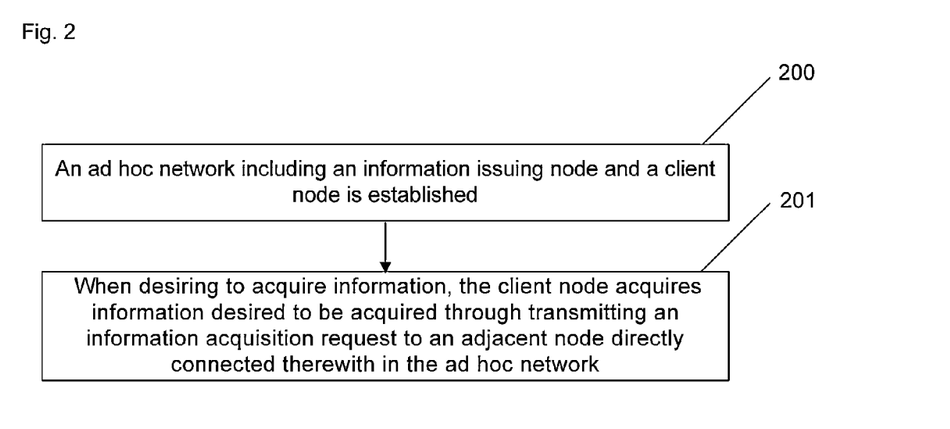
FIG. 2 is a schematic flow chart of a method for acquiring information according to the present disclosure.

The present disclosure further provides a method for acquiring information, and, as shown in FIG. 2, the method includes the following steps:

Step 200, an ad hoc network including an information issuing node and a client node is established, then proceed to step 201;

Herein this step may be implemented by using the prior art.

Specifically, the information issuing node can be regarded as a server, and in practical use all information issuing nodes constitute a group of servers, which are static or dynamic and open, for users to access. Besides used to network and forward messages, the information issuing node is also used to receive and store information issued by users namely businesses to which all other information issuing nodes are attributive.

In addition, the information issuing node may further and can only modify information issued by a user to which itself is attributive. When information issued by a user to which an information issuing node itself is attributive changes, the information issuing node will notify all other nodes in an established ad hoc network to update the information issued by the user to which itself is attribute. Herein the information may specifically be business information. The business information may be information of parking lots or business information of shopping malls.

One user can have one or more information issuing nodes attributive to him/her, which may be fixed or mobile.

The client node is configured to store and forward information issued by a user to which the information issuing node is attributive and it can further be configured to acquire the information issued by the suer to which the information issuing node is attributive, but it can't modify acquired and/or stored information. The client node can join in an ad hoc network desired to join in through searching and transmits an information acquisition request for acquiring corresponding information from other nodes. Herein the other nodes can be an information issuing node or a client node.

In an embodiment, the client node may specifically be a mobile terminal used by a client.

Step 201, when desiring to acquire information, the client node acquires information desired to be acquired through transmitting an information acquisition request to an adjacent node directly connected therewith in the ad hoc network;

specifically, when desiring to acquire information, the client node transmits the information acquisition request to the adjacent node; the adjacent node determines whether itself stores all information desired by the received information acquisition request according to a scope of information desired to be acquired in the received information acquisition request, after determining itself stores part of information desired by the received information acquisition request, returning to the client node part of information desired by the received information acquisition request and stored therein, modifies the scope of information desired to be acquired in the received information acquisition request and forwards the modified information acquisition request to a next node directly connected therewith;

the next node determines whether itself stores all information desired by the received information acquisition request according to a scope of information desired to be acquired in the received information acquisition request, after determining itself stores part of information desired by the received information acquisition request, returns to the client node part of information desired by the received information acquisition request and stored therein through forwarding by a routing node, modifies the scope of information desired to be acquired in the received information acquisition request and forwards the modified information acquisition request to a further next node directly connected therewith, and so on until the client node acquires the information desired to be acquired;

the client node compares ID numbers and issuing time of all received information so as to obtain newest information desired to be acquired.

In an embodiment, after the adjacent node determines that itself stores all information desired by the received information acquisition request, it returns to the client node all information desired by the received information acquisition request and stored in the adjacent node itself, accordingly, information received by the client node is information desired to be acquired, then there is no need to compare ID numbers and issuing time in the received information.

Accordingly, after the next node determines that itself stores all information desired by the received information acquisition request, the next node returns directly to the new information issuing node through a routing node all information desired by the received information acquisition request and stored in the next node itself, and then doesn't forward the information acquisition request to a node directly connected therewith.

after the adjacent node determines that itself doesn't store any information desired by the received information acquisition request, forwarding directly the received information acquisition request to other nodes directly connected therewith. Accordingly, after the next node determines that itself doesn't store any information desired by the received information acquisition request, it forwards directly the received information acquisition request to a node directly connected therewith.

The structure of stored information can be on a per-user basis, i.e., information issued by each user is a piece of information; the content of stored information issued by a user includes an ID number, name, type, business information and issuing time; specifically, the ID number is used to identify a unique user, the name is used to identify a specific user to facilitate clients for searching, the type is used to identify management type of a user, the business information is used to identify specific information issued by a user, and the issuing time is used to identify a specific time when business information is modified by a user.

A scope of information desired to be acquired is set as desired, the scope of information desired to be acquired may specifically include a scope of ID numbers and issuing time and the like, in other words, a user to which the client node is attributive can obtain desired information according to the scope of information desired to be acquired.

The adjacent node may be other nodes other than a client node transmitting an information acquisition request and/or an information issuing node.

The present disclosure will be further described in detail below with reference to embodiments.

Figure 3:
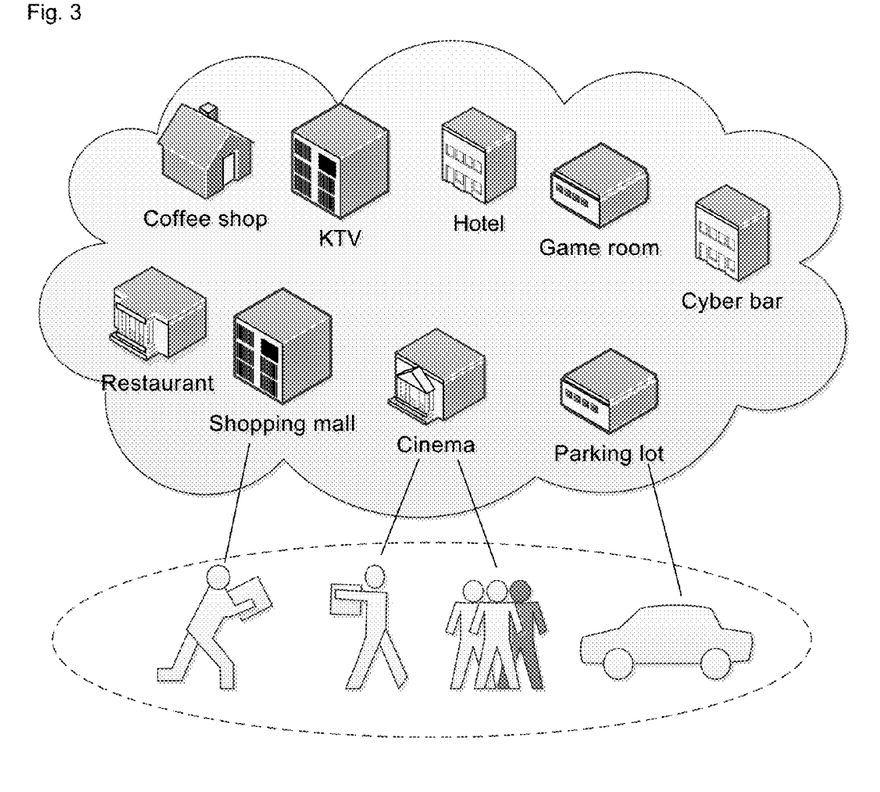
FIG. 3 is a schematic diagram showing a topological scenario of an ad hoc network used in an embodiment of the present disclosure.

FIG. 3 is a schematic diagram showing a topological scenario of an ad hoc network used in an embodiment of the present disclosure, as shown in FIG. 3, users to which an information issuing node is attributive are businesses on both sides of a street, including coffee shops, restaurants, shopping malls, cinemas, parking lots, cyber bars, game rooms, hotels and KTVs, and client nodes include mobile terminals used by people walking on the street and used by drivers.

Figure 4:
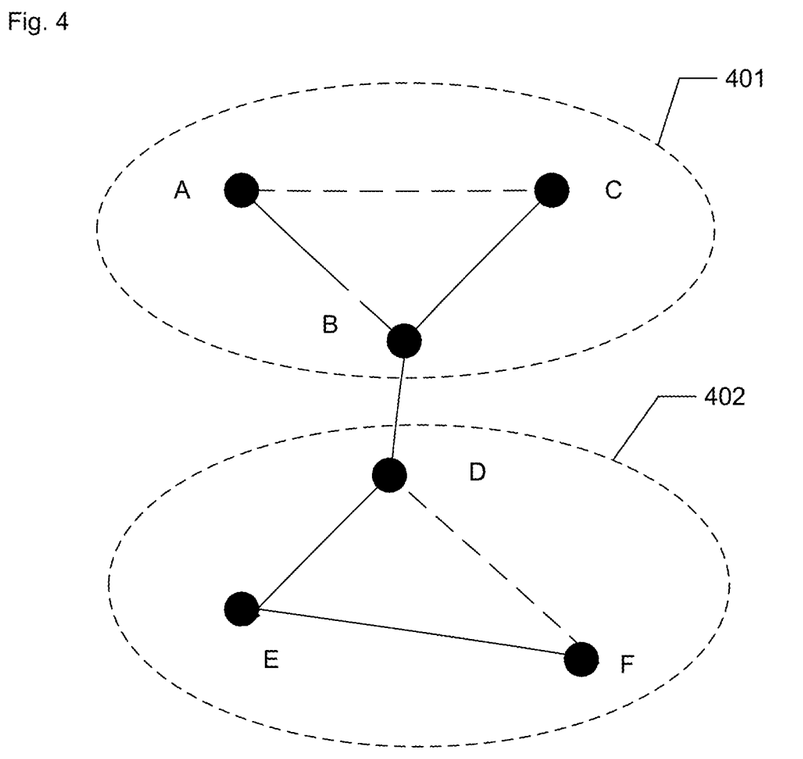
FIG. 4 is a schematic structural diagram showing a topology of an ad hoc network established in an embodiment of the present disclosure.

FIG. 4 is a schematic structural diagram showing a topology of an ad hoc network established in an embodiment of the present disclosure, as shown in FIG. 4, information issuing nodes A, B and C in an established ad hoc network constitute a group of servers 401 while client nodes D, E and F in the established ad hoc network constitute a group of clients 402, specifically, the information issuing node A is directly connected with the information issuing node B, the information issuing node B is directly connected with the information issuing node C, the information issuing node B is further directly connected with the client node D, the client node D is directly connected with the client node E, the client node E is directly connected with the client node F, direct communication can be implemented between the information issuing node A and the information issuing node B, between the information issuing node B and the information issuing node C, between the information issuing node B and the information issuing node D and between the client node D and the client node F, the information issuing node A can communicate with the information issuing node C through the information node B, and the client node D can communicate with the client node F through the client node E.

Herein it should be noted that the information issuing nodes A, B and C and the client nodes D, E and F described in FIG. 4 are only used to exhibit a topology of an ad hoc network used by the embodiment instead of representing that the information issuing nodes of the embodiment include only A, B and C and the client nodes include only D, E and F.

Figure 5:
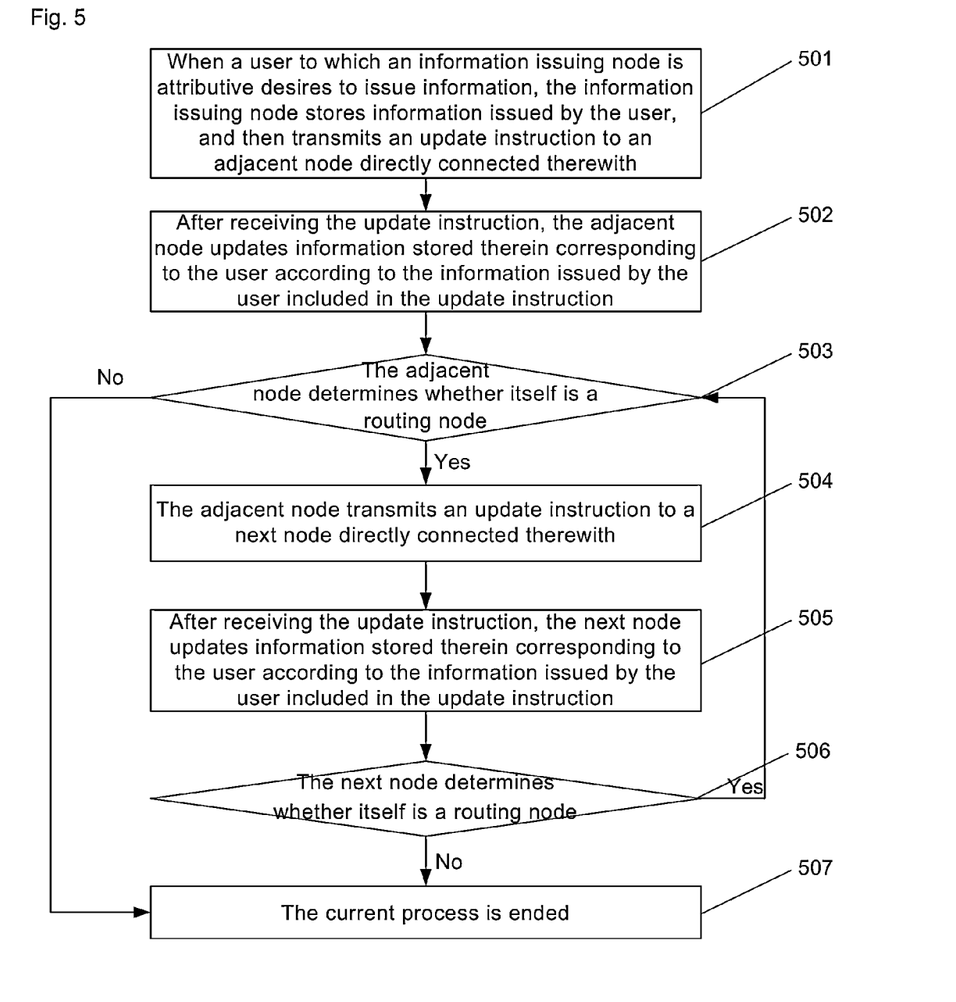
FIG. 5 is a schematic flow chart of a method for issuing information according to an embodiment of the present disclosure.

The method for issuing information according to the embodiment, as shown in FIG. 5, includes the following steps:

Step 501, when a user to which an information issuing node is attributive desires to issue information, the information issuing node stores information issued by the user, and then transmits an update instruction to an adjacent node directly connected therewith;

herein the update instruction includes the information issued by the user.

The adjacent node may be an information issuing node and/or a client node.

Step 502, after receiving the update instruction, the adjacent node updates information stored therein corresponding to the user according to the information issued by the user included in the update instruction, then proceed to step 503;

step 503, the adjacent node determines whether itself is a routing node, if Yes, proceed to step 504, otherwise, proceed to step 507;

step 504, the adjacent node transmits an update instruction to a next node directly connected therewith;

herein the update instruction includes the information issued by the user.

The next node may be an information issuing node and/or a client node.

Step 505, after receiving the update instruction, the next node updates information stored therein corresponding to the user according to the information issued by the user included in the update instruction, then proceed to step 506;

step 506, the next node determines whether itself is a routing node, if Yes, proceed to step 504, otherwise, proceed to step 507;

herein above steps 504-506 are repeated until all other nodes of the ad hoc network receives the information issued by the user.

Step 507, the current process is ended.

Figure 6:
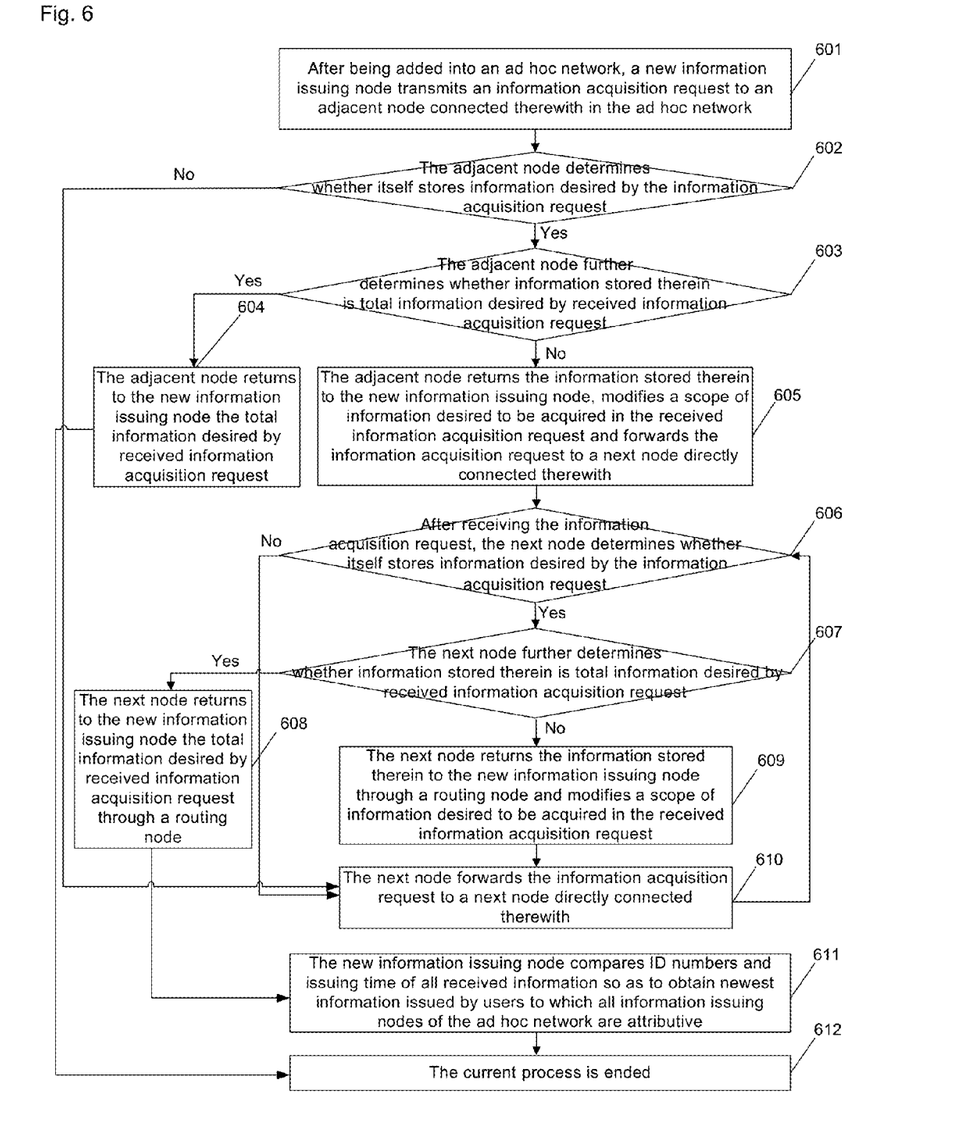
FIG. 6 is schematic flow chart showing a method for a new information issuing node to acquire information according to an embodiment of the present disclosure.

When a new information issuing node is added into the established ad hoc network according to the embodiment, a method for the new information issuing node to acquire information according to the embodiment, as shown in FIG. 6, includes the following steps:

step 601, after being added into an ad hoc network, a new information issuing node transmits an information acquisition request to an adjacent node connected therewith in the ad hoc network;

herein the information acquisition request includes a scope of information desired to be acquired, i.e., information issued by users to which all information issuing nodes of the ad hoc network are attributive.

The adjacent node may be an information issuing node and/or a client node.

Step 602, the adjacent node determines whether itself stores information desired by the information acquisition request, if Yes, proceed to step 603, otherwise, proceed to step 610;

step 603, the adjacent node further determines whether information stored therein is total information desired by received information acquisition request, if Yes, proceed to step 604, otherwise, proceed to step 605;

step 604, the adjacent node returns to the new information issuing node the total information desired by received information acquisition request, then proceed to step 612;

step 605, the adjacent node returns the information stored therein to the new information issuing node, modifies a scope of information desired to be acquired in the received information acquisition request and forwards the information acquisition request to a next node directly connected therewith;

Step 606, after receiving the information acquisition request, the next node determines whether itself stores information desired by the information acquisition request, if Yes, proceed to step 607, otherwise, proceed to step 610;

herein the next node may be an information issuing node and/or a client node.

step 607, the next node further determines whether information stored therein is total information desired by received information acquisition request, if Yes, proceed to step 608, otherwise, proceed to step 609;

step 608, the next node returns to the new information issuing node the total information desired by received information acquisition request through a routing node, then proceed to step 611;

step 609, the next node returns the information stored therein to the new information issuing node through a routing node and modifies a scope of information desired to be acquired in the received information acquisition request, then proceed to step 610;

step 610, the next node forwards the information acquisition request to a next node directly connected therewith, then proceed to step 606;

herein steps 606-610 are implemented recurrently until the new information issuing node acquires the information issued by users to which all information issuing nodes of the ad hoc network are attributive.

Step 611, the new information issuing node compares ID numbers and issuing time of all received information so as to obtain newest information issued by users to which all information issuing nodes of the ad hoc network are attributive, then proceed to step 612;

Step 612, the current process is ended.

Herein, after the adjacent node determines that information stored in the node itself is total information issued by users to which all information issuing nodes of the ad hoc network are attributive, the node returns to the new information issuing node all information desired by the received information acquisition request and stored in the node itself, accordingly, information received by the new information issuing node is information issued by users to which all information issuing nodes of the ad hoc network are attributive, then there is no need to compare ID numbers and issuing time in the received information.

In the embodiment, a method for a client node to acquire information is the same as a method for a newly-added information issuing node to acquire information, thus the detailed description thereof will be omitted. Differences lie in that a scope of information desired to be acquired by a new information issuing node is information issued by users to which all information issuing nodes of the ad hoc network are attributive while a scope of information desired to be acquired by a client node is set as desired by a client to which the client node is attributive.

It can seen from above description that technical solutions according to the present disclosure can implement flexible networking, and can issue and acquire information without accessing the Internet so that clients are conveniently provided with information of parking lots, businesses and hotels within 1 km to 10 km around the clients; and devices made from the present disclosure are simple, cheap and easy to maintain, and in practical use even WiFi devices provided by places such as a hotel or restaurant can be directly used to establish an ad hoc network so as to implement issuing and acquisition of information.

Figure 7:
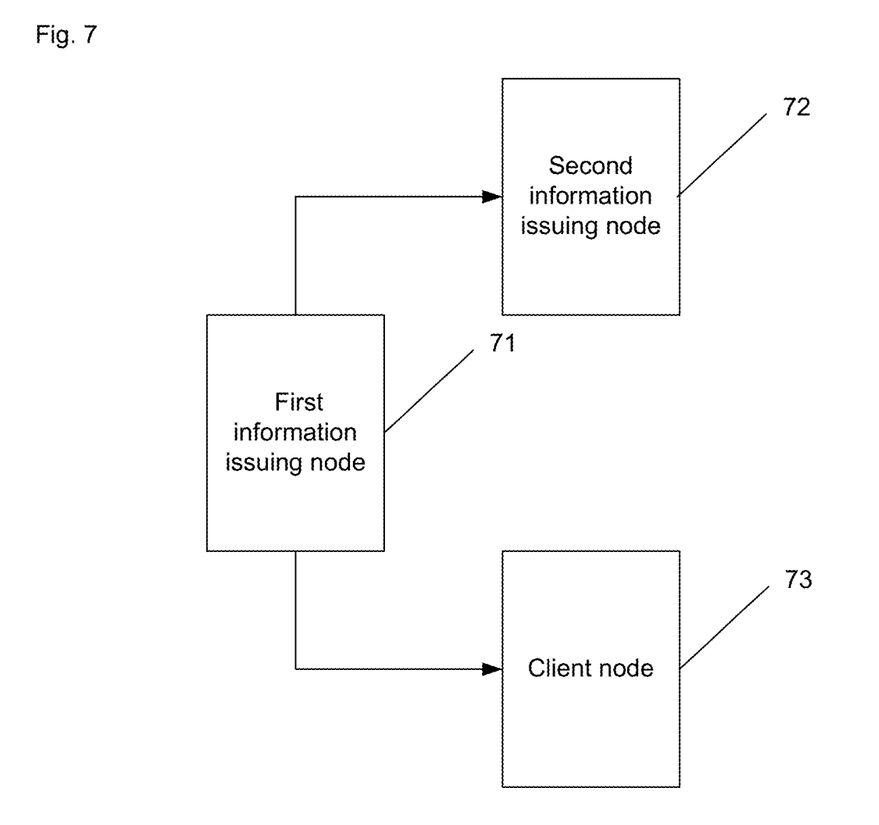
FIG. 7 is a schematic structural diagram of a system for issuing information according to the present disclosure.

In order to implement the above method for issuing information, the present disclosure further provides a system for issuing information, as shown in FIG. 7, the system includes a first information issuing node 71 configured to, when a user to which the first information issuing node is attributive desires to issue information, store information issued by the user, broadcast the information issued by the user to an ad hoc network including an information issuing node and a client node where itself is located and notify all other nodes of the ad hoc network to update information of the first information issuing node 71.

Herein the system may further include a second information issuing node 72 and/or a client node 73;

when broadcasting the information issued by the user to the ad hoc network where itself is located, the first information issuing node 71 is specifically configured to broadcast the information issued by the user to the ad hoc network where itself is located and notify all other nodes of the ad hoc network to update information of the first information issuing node 71 through the second information issuing node 72 and/or the client node 73.

In an embodiment, the second information issuing node 72 and/or the client node 73 are adjacent nodes directly connected with the first information issuing node 71; the broadcasting may specifically include: the first information issuing node 71 transmits the information issued by the user to the second information issuing node 72 and/or the client node 73; after receiving the information issued by the user, the second information issuing node 72 and/or the client node 73 update information stored therein corresponding to the user, and forwards received information to other nodes connected therewith other than a node transmitting the information issued by the user after determining that themselves are a routing node, and so on until all other nodes of the ad hoc network receive the information issued by the user.

The first information issuing node 71, the second information issuing node 72 and the client node 73 may be any one of nodes in the ad hoc network.

The system may further include a third information issuing node configured to, when itself is newly added into the ad hoc network, acquire and store information issued by users to which all information issuing nodes of the ad hoc network are attributive through transmitting an information acquisition request to a node connected therewith in the ad hoc network.

Herein a specific processing process implemented by the third information issuing node in the system for issuing information according to the present disclosure is already described above, thus the detailed description thereof will be omitted.

Figure 8:
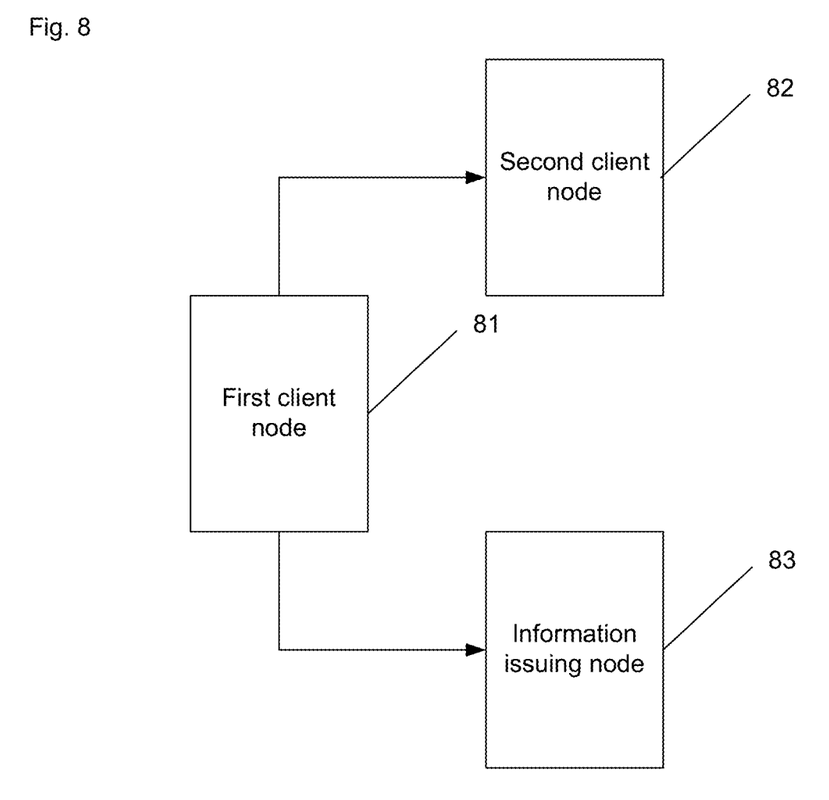
FIG. 8 is a schematic structural diagram of a system for acquiring information according to the present disclosure.

In order to implement the above method for acquiring information, the present disclosure further provides a system for acquiring information, as shown in FIG. 8, the system includes a first client node 81, a second client node 82 and/or an information issuing node 83, wherein the first client node 81 is configured to, when desiring to acquire information, acquire information desired to be acquired through transmitting an information acquisition request to the second client node 82 and/or the information issuing node 83 of an ad hoc network including an information issuing node and a client node and directly connected therewith.

Herein a specific processing process implemented by the second client node in the system for acquiring information according to the present disclosure is already described above, thus the detailed description thereof will be omitted.

What described are merely preferable embodiments of the present disclosure, and are not intended to limit the present disclosure.

The invention claimed is:

1. A method for issuing information comprising establishing an ad hoc network including an information issuing node and a client node, the method further comprising:

when a user to which the information issuing node is attributive desires to issue information, storing, by the information issuing node, information issued by the user, broadcasting the information issued by the user to the ad hoc network and notifying all other nodes of the ad hoc network to update information of the information issuing node;

wherein the method further comprises:

when a new information issuing node is added into the ad hoc network, acquiring and storing, by the new information issuing node, information issued by users to which all information issuing nodes of the ad hoc network are attributive through transmitting an information acquisition request to a node connected therewith in the ad hoc network;

wherein the acquiring, by the new information issuing node, information issued by users to which all information issuing nodes of the ad hoc network are attributive through transmitting an information acquisition request to a node connected therewith in the ad hoc network comprises:

transmitting, by the new information issuing node, an information acquisition request to a node connected therewith in the ad hoc network, returning, by a node receiving the information acquisition request, information stored therein to the new information issuing node, and after determining that the information stored therein is part of the information issued by users to which all information issuing nodes of the ad hoc network are attributive, modifying a scope of information desired to be acquired in the received information acquisition request and forwarding the modified information acquisition request to a next node directly connected therewith;

determining, by the next node, whether itself stores all information desired by the received information acquisition request according to a scope of information desired to be acquired in the received information acquisition request, after determining itself stores part of information desired by the received information acquisition request, returning to the new information issuing node part of information desired by the received information acquisition request and stored therein through forwarding by a routing node, modifying the scope of information desired to be acquired in the received information acquisition request and forwarding the modified information acquisition request to a further next node directly connected therewith, and so on until the new information issuing node acquires the information issued by users to which all information issuing nodes of the ad hoc network are attributive; and comparing, by the new information issuing node, ID numbers and issuing time of all received information so as to obtain newest information issued by users to which all information issuing nodes of the ad hoc network are attributive.

2. The method according to claim 1, wherein the broadcasting the information issued by the user to the ad hoc network and notifying all other nodes of the ad hoc network to update information of the information issuing node comprises:

transmitting, by the information issuing node, the information issued by the user to an adjacent node directly connected therewith; after receiving the information issued by the user, updating, by the adjacent node, information stored therein corresponding to the user, and forwarding the received information to other nodes connected therewith other than a node transmitting the information issued by the user after determining that the adjacent node itself is a routing node, and so on until all other nodes of the ad hoc network receive the information issued by the user;

wherein the adjacent node is an information issuing node and/or a client node.

3. The method according to claim 2, further comprising:
when determining that the adjacent node itself is not a routing node, performing, by the adjacent node, no operations any more after updating the information stored therein corresponding to the user.

4. The method according to claim 1, further comprising:
after a node receiving an information acquisition request transmitted by the new information issuing node determines that information stored in the node itself is total information issued by users to which all information issuing nodes of the ad hoc network are attributive, returning to the new information issuing node all information desired by the received information acquisition request and stored in the node itself; or after a next node receiving an information acquisition request determines that itself stores all information desired by the received information acquisition request, returning directly to the new information issuing node through a routing node all information desired by the received information acquisition request and stored in the next node itself.

5. A method for acquiring information comprising establishing an ad hoc network including an information issuing node and a client node, the method further comprising:
when desiring to acquire information, acquiring, by the client node, information desired to be acquired through transmitting an information acquisition request to an adjacent node directly connected therewith in the ad hoc network;

wherein the acquiring by the client node information desired to be acquired through transmitting an information acquisition request to an adjacent node directly connected therewith in the ad hoc network comprises:
transmitting, by the client node, the information acquisition request to the adjacent node; determining, by the adjacent node, whether itself stores all information desired by the received information acquisition request according to a scope of information desired to be acquired in the received information acquisition request, after determining itself stores part of information desired by the received information acquisition request, returning to the client node part of information desired by the received information acquisition request and stored therein, modifying the scope of information desired to be acquired in the received information acquisition request and forwarding the modified information acquisition request to a next node directly connected therewith;

determining, by the next node, whether itself stores all information desired by the received information acquisition request according to a scope of information desired to be acquired in the received information acquisition request, after determining itself stores part of information desired by the received information acquisition request, returning to the client node part of information desired by the received information acquisition request and stored therein through forwarding by a routing node, modifying the scope of information desired to be acquired in the received information acquisition request and forwarding the modified information acquisition request to a further next node directly connected therewith, and so on until the client node acquires the information desired to be acquired; and comparing, by the client node, ID numbers and issuing time of all received information so as to obtain newest information desired to be acquired.

6. The method according to claim 5, wherein the adjacent node is a client node and/or an information issuing node.

7. The method according to claim 6, further comprising:
after the adjacent node determines that itself doesn't store information desired by the received information acquisition request, forwarding directly the received information acquisition request to other nodes directly connected therewith;

after the next node determines that itself doesn't store information desired by the received information acquisition request, forwarding directly the received information acquisition request to a node directly connected therewith.

8. The method according to claim 5, further comprising:
after the adjacent node determines that itself stores all information desired by the received information acquisition request, returning to the client node all information desired by the received information acquisition request and stored in the adjacent node itself; or after the next node determines that itself stores all information desired by the received information acquisition request, returning directly to the client node through a routing node all information desired by the received information acquisition request and stored in the next node itself.

9. The method according to claim 8, further comprising:
after the adjacent node determines that itself doesn't store information desired by the received information acquisition request, forwarding directly the received information acquisition request to other nodes directly connected therewith;

after the next node determines that itself doesn't store information desired by the received information acquisition request, forwarding directly the received information acquisition request to a node directly connected therewith.

10. A system for issuing information, comprising a first information issuing node configured to, when a user to which the first information issuing node is attributive desires to issue information, store information issued by the user, broadcast the information issued by the user to an ad hoc network including an information issuing node and a client node where itself is located and notify all other nodes of the ad hoc network to update information of the first information issuing node;

wherein the system further comprises a third information issuing node configured to, when itself is newly added into the ad hoc network, acquire and store information issued by users to which all information issuing nodes of the ad hoc network are attributive through transmitting an information acquisition request to a node connected therewith in the ad hoc network wherein the procedure of acquiring information issued by users to which all information issuing nodes of the ad hoc network are attributive through transmitting an information acquisition request to a node connected therewith in the ad hoc network comprises:
when the third information issuing node is added into the ad hoc network, the third information issuing node transmits an information acquisition request to a node connected therewith in the ad hoc network, a node receiving the information acquisition request returns information stored therein to the third information issuing node, and after determining that the information stored therein is part of the information issued by users to which all information issuing nodes of the ad hoc network are attributive, modifies a scope of information desired to be acquired in the received information acquisition request and forwards the modified information acquisition request to a next node directly connected therewith;

the next node determines whether itself stores all information desired by the received information acquisition request according to a scope of information desired to be acquired in the received information acquisition request, after determining itself stores part of information desired by the received information acquisition request, returns to the third information issuing node part of information desired by the received information acquisition request and stored therein through forwarding by a routing node, modifies the scope of information desired to be acquired in the received information acquisition request and forwards the modified information acquisition request to a further next node directly connected therewith, and so on until the third information issuing node acquires the information issued by users to which all information issuing nodes of the ad hoc network are attributive; and the third information issuing node compares ID numbers and issuing time of all received information so as to obtain newest information issued by users to which all information issuing nodes of the ad hoc network are attributive.

11. The system according to claim 10, further comprising a second information issuing node and/or a client node;

when broadcasting the information issued by the user to the ad hoc network where itself is located, the first information issuing node is specifically configured to broadcast the information issued by the user to the ad hoc network where itself is located and notify all other nodes of the ad hoc network to update information of the first information issuing node through the second information issuing node and/or the client node.

12. A system for acquiring information, comprising a first client node, a second client node and/or an information issuing node, wherein the first client node is configured to, when desiring to acquire information, acquire information desired to be acquired through transmitting an information acquisition request to a second client node and/or an information issuing node of an ad hoc network including an information issuing node and a client node and directly connected therewith;

wherein the procedure of acquiring information desired to be acquired through transmitting an information acquisition request to an adjacent node directly connected therewith in the ad hoc network comprises:

the client node transmits the information acquisition request to the adjacent node; the adjacent node determines whether itself stores all information desired by the received information acquisition request according to a scope of information desired to be acquired in the received information acquisition request, after determining itself stores part of information desired by the received information acquisition request, returns to the client node part of information desired by the received information acquisition request and stored therein, modifies the scope of information desired to be acquired in the received information acquisition request and forwards the modified information acquisition request to a next node directly connected therewith;

the next node determines whether itself stores all information desired by the received information acquisition request according to a scope of information desired to be acquired in the received information acquisition request, after determining itself stores part of information desired by the received information acquisition request, returns to the client node part of information desired by the received information acquisition request and stored therein through forwarding by a routing node, modifies the scope of information desired to be acquired in the received information acquisition request and forwards the modified information acquisition request to a further next node directly connected therewith, and so on until the client node acquires the information desired to be acquired; and the client node compares ID numbers and issuing time of all received information so as to obtain newest information desired to be acquired.

* * * * *